United States Patent [19]
Eto

[11] Patent Number: 5,917,988
[45] Date of Patent: Jun. 29, 1999

[54] EDITING APPARATUS, EDITING METHOD AND DECODING APPARATUS FOR COMPRESSED VIDEO SIGNAL

[75] Inventor: Toru Eto, Kanagawa, Japan

[73] Assignee: Sony Corporation, Tokyo, Japan

[21] Appl. No.: 08/750,356

[22] PCT Filed: Apr. 8, 1996

[86] PCT No.: PCT/JP96/00965

§ 371 Date: Dec. 6, 1996

§ 102(e) Date: Dec. 6, 1996

[87] PCT Pub. No.: WO96/31981

PCT Pub. Date: Oct. 10, 1996

[30] Foreign Application Priority Data

Apr. 7, 1995 [JP] Japan .................................... 7-082997

[51] Int. Cl.⁶ .................................................. H04N 5/93
[52] U.S. Cl. .................... 386/52; 386/46; 386/4
[58] Field of Search ..................... 386/4, 52–53, 386/64, 109, 46, 111–112; 360/8, 13; 369/83; 345/328; H04N 5/93

[56] References Cited

U.S. PATENT DOCUMENTS

| | | | |
|---|---|---|---|
| 5,083,860 | 1/1992 | Miyatake et al. | 352/129 |
| 5,191,436 | 3/1993 | Yonemitsu | 358/335 |
| 5,243,603 | 9/1993 | Broeren | 371/27 |
| 5,408,328 | 4/1995 | Boliek et al. | 358/261.4 |
| 5,500,743 | 3/1996 | Sakaegi et al. | 358/403 |
| 5,521,898 | 5/1996 | Ogasawara | 369/124 |
| 5,631,742 | 5/1997 | Shimoda | 386/52 |
| 5,701,386 | 12/1997 | Yoneyama | 386/909 |
| 5,732,183 | 3/1998 | Sugiyama | 386/4 |
| 5,793,894 | 8/1998 | Sugiyama | 382/236 |

FOREIGN PATENT DOCUMENTS

| | | |
|---|---|---|
| 6-253210 | 9/1994 | Japan . |
| 8-18912 | 1/1996 | Japan . |
| 8-70422 | 3/1996 | Japan . |
| 8-149408 | 6/1996 | Japan . |

*Primary Examiner*—Wendy Garber
*Assistant Examiner*—Vincent F. Boccio
*Attorney, Agent, or Firm*—Frommer Lawrence & Haug, LLP.; William S. Frommer; Dennis M. Smid

[57] ABSTRACT

Reproduction instruction and inherent address information from a control unit 3 are sent to drive units 1, 2. Thus, compressed video signals every groups of pictures to which inherent address information are respectively added are outputted from the drive units 1, 2. They are edited after undergone switching at a switch circuit 4. The edited compressed video signals are transmitted to a decoding unit 5. This decoding unit 5 detects, by using inherent address information, the editing point of the video signals which have been edited after undergone switching to carry out decoding processing thereof to output a video signal, thereby making it possible to obtain a video signal of satisfactory picture quality without outputting noise at the editing point.

11 Claims, 12 Drawing Sheets

5,917,988

EDITING APPARATUS, EDITING METHOD AND DECODING APPARATUS FOR COMPRESSED VIDEO SIGNAL

TECHNICAL FIELD

This invention relates to a compressed video signal editing apparatus and a compressed video signal editing method for editing compressed video signals of plural materials (data) of different signal sources, and a compressed video signal decoding apparatus for decoding compressed video signals of plural materials (data) of different signal sources.

BACKGROUND ART

Since moving picture data have extremely large information quantity, in the case where those information are recorded for a long time, means for recording video signals after undergone efficient encoding and for efficiently decoding those recorded signals when they are read out is indispensable. To meet with such requirement, several efficient encoding systems utilizing correlation in the video signal are proposed. As one of them, there is the MPEG (Moving Picture Experts Group) system.

In accordance with the MPEG system, difference between picture frames of a video signal is first taken by making use of the interframe correlation to thereby reduce redundancy in the time axis direction. Thereafter, processing such as Discrete Cosine Transform (DCT), etc. is carried out by making use of the line correlation to reduce redundancy in the spatial axis direction to thereby efficiently encode the video signal.

In this MPEG system, since in the case where only the difference signal between two frame pictures is transmitted when the interframe correlation is utilized, the original picture cannot be restored (reconstructed), there is used a method in which pictures of respective frames are caused to be any pictures of three kinds of pictures of the I picture (Intra Picture), P picture (Predictive Picture) and B picture (Bidirectional predictive Picture) to combine frame pictures of these three kinds of pictures to carry out compression encoding. The I picture is picture data compressed by only corresponding frame picture. The P picture is picture data compressed on the basis of corresponding frame picture and frame picture of I picture preceding (earlier) with respect to the corresponding frame picture and nearest thereto (in point of time). The B picture is picture data compressed on the basis of pictures of three frames in total of corresponding picture, and frame pictures of I picture and P picture respectively nearest thereto (in point of time) before and after the corresponding picture. At this time, the unit when picture data every frame are caused to undergo compression processing is called Group Of Pictures (GOP).

In this MPEG system, when the interframe predictive encoding is carried out, there are instances where such encoding is conducted in the state crossing over two groups of pictures.

In more practical sense, in the case where, e.g., the configuration of the group of pictures is as indicated by the configuration of the group of pictures $GOP_1$, $GOP_2$, $GOP_3$ ... shown in FIG. 1, the B picture which is the leading picture of each group of pictures is prepared by I picture subsequent (succeeding) thereto and P picture which is the last picture of the group of pictures earlier (preceding) by one. For this reason, in order to decode the leading B picture of a certain group of pictures, picture data of the group of pictures earlier (preceding) by one is required.

Meanwhile, as shown in FIG. 2, for example, when switching into compressed picture data of material (data) B is carried out at the editing point P in the course of transmitting groups of pictures $GOP_{A1}$, $GOP_{A2}$ of compressed picture data of material (data) A to transmit groups of pictures $GOP_{B1}$, $GOP_{B2}$ of compressed picture data of the material B in a manner continuous to the group of pictures $GOP_{A2}$ of compressed picture data thereafter to decode the compressed picture data thus transmitted, decoding is carried out by using $P_8$ picture from the group of pictures $GOP_{A2}$ of the material A which has not any correlation in decoding $B_9$ picture of the group of pictures $GOP_{B1}$. Accordingly, the picture quality would be degraded to much degree.

With actual circumstances as described above in view, an object of this invention is to provide a compressed video signal editing apparatus, a compressed video signal editing method and a compressed video signal decoding apparatus which can decode, without degrading the picture quality, compressed picture data edited after undergone switching on the way.

DISCLOSURE OF THE INVENTION

A compressed video signal editing apparatus according to this invention comprises: a sending unit comprising video signal output means for outputting a compressed video signal of plural frames in the state where discrimination information for discriminating between signal sources are added thereto every editing units each consisting of the compressed video signal of plural frames, and switching means for outputting the compressed video signals every the editing units from plural ones of the video signal output means after undergone switching; and a detecting unit comprising extraction means for extracting the discrimination information every the editing units of the compressed video signals from the sending unit, and detecting means for comparing the discrimination information every the editing units extracted by the extraction means to detect, as the editing point of the compressed video signals, the point where different ones of the discrimination information exist before and after the editing unit, thereby to solve the above-described problems.

Moreover, a compressed video signal editing method according to this invention comprises the steps of: outputting compressed video signals of plural frames in the state where discrimination information for discriminating between signal sources are added thereto every editing units each consisting of the compressed video signal of plural frames; outputting the compressed video signals every the editing units from plural ones of the stages for outputting the compressed video signals after undergone switching; extracting the discrimination information every the editing units of the compressed video signals; and comparing the extracted discrimination information every the editing units to detect, as the editing point of the compressed video signals, the point where different ones of the discrimination information exist before and after the editing unit.

Further, a compressed video signal decoding apparatus according to this invention comprises detecting means for extracting discrimination information for discriminating between signal sources, which are added every editing units each consisting of a compressed video signal of plural frames, to detect, as the editing point, the point where different ones of the discrimination information exist before and after the editing unit, whereby when the editing point is detected by the detecting means, such a decoding processing to be completed within the editing unit is carried out with respect to the compressed video signals of the editing unit before and after the editing point, thereby to solve the above-described problems.

In this invention, such an approach is employed to send out compressed video signals of different materials (data) in which discrimination information for discriminating between signal sources are added thereto every editing units consisting of the compressed video signal of plural frames after undergone switching to extract the discrimination information every editing units of the sent compressed video signals to compare them to thereby detect, as the editing point of the compressed video signals, the point where different discrimination information exist before and after the editing unit, whereby when the editing unit is detected, such a decoding processing to be completed within the editing unit is carried out in carrying out decoding processing of the compressed video signal of the editing unit after the editing unit, thereby making it possible to easily carry out decoding processing of the compressed video signal.

BEST MODE FOR CARRYING OUT THE INVENTION

Preferred embodiments according to this invention will be now described with reference to the attached drawings. Outline of the configuration of a compressed video signal editing apparatus according to this invention is shown in FIG. 3.

Figure 1:
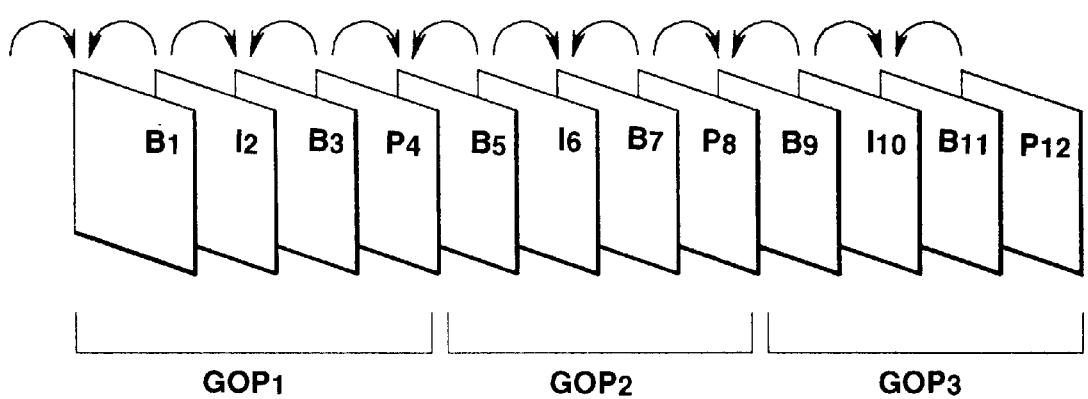
FIG. 1 is a view for explaining the predictive direction of B picture.
Figure 2:
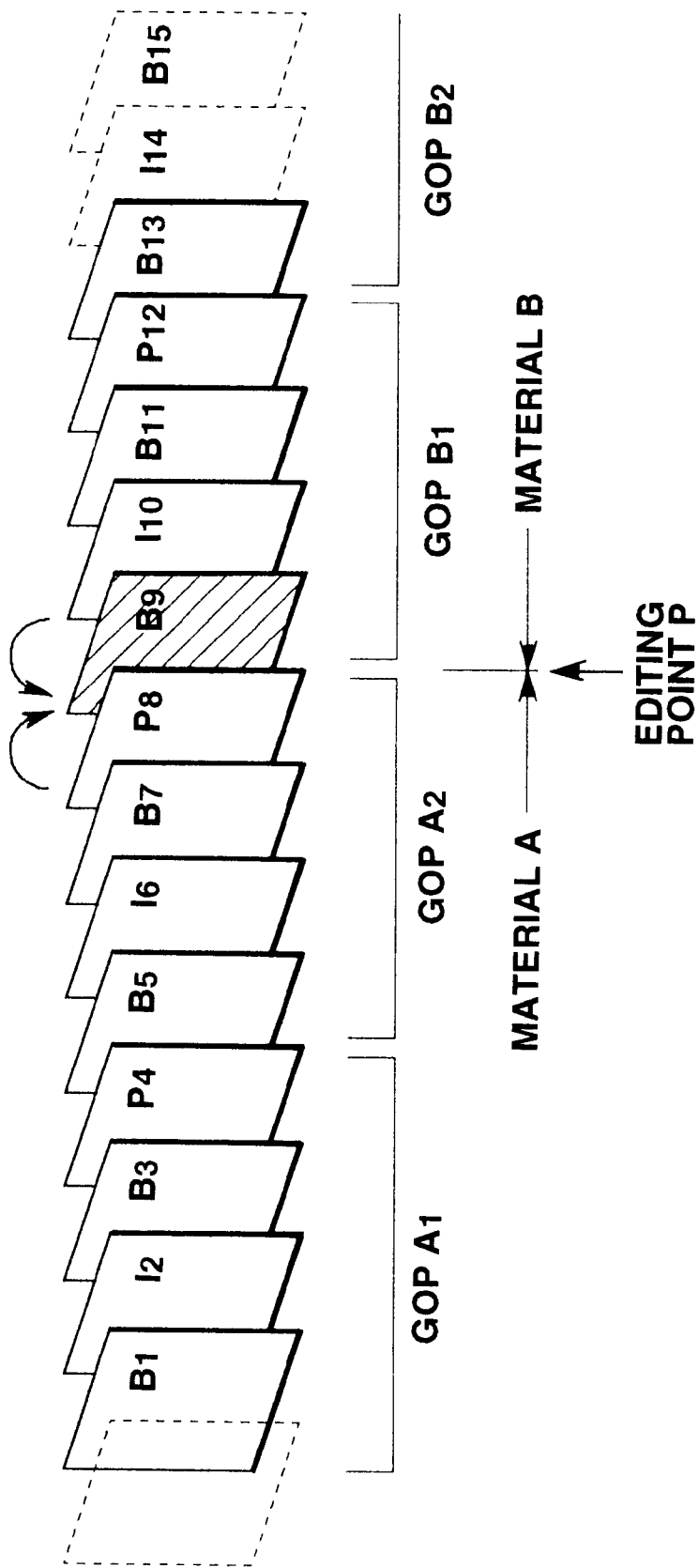
FIG. 2 is a view for explaining decoding processing at the editing point.
Figure 3:
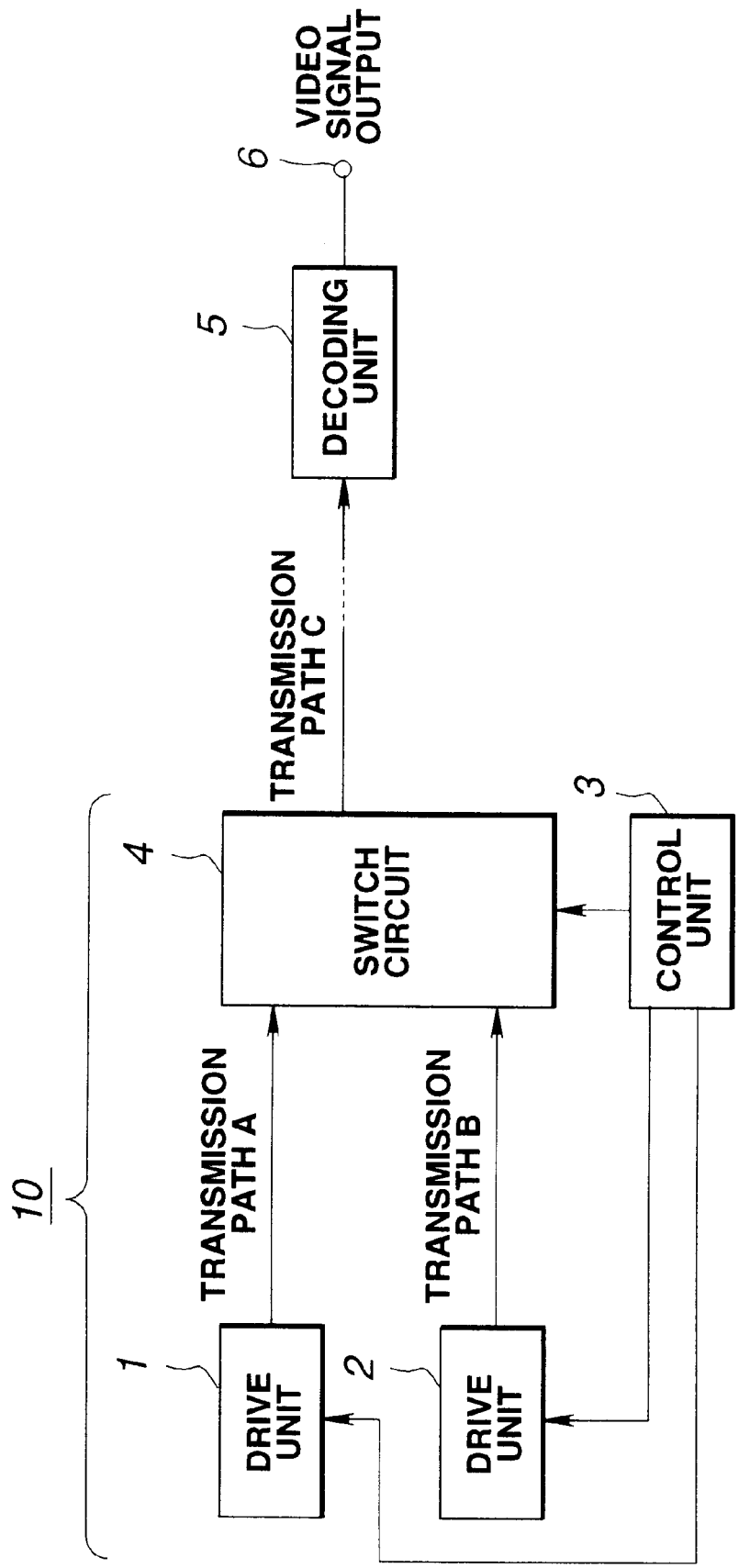
FIG. 3 is a block diagram showing outline of a compressed video signal editing apparatus according to this invention.

The compressed video signal editing apparatus of FIG. 3 comprises: a sending unit 10 comprising drive units 1, 2 serving as video signal output means for outputting compressed video signals of plural frames in the state where discrimination information for discriminating between signal sources are added thereto every editing units each consisting of the compressed video signal of plural frames, i.e., every the so-called groups of pictures, and a switch circuit 4 serving as switching means for outputting the compressed video signals every groups of pictures from the plural drive units 1, 2; and a decoding unit 5 for allowing the continuous compressed video signals from the plural signal sources transmitted from the sending unit 10 to undergo decoding processing to output them as video signals.

The drive units 1, 2 are a MO drive unit using a magneto-optical disc so-called MO disc capable of carrying out high density recording, and compressed video signals are recorded on the MO disc. Inherent (source) address information inherent in corresponding drive units are sent from a control unit 3 to the drive units 1, 2 through communication interface, e.g., RS-422 as discrimination information for discriminating reproduction instruction and/or signal source.

Figure 4:
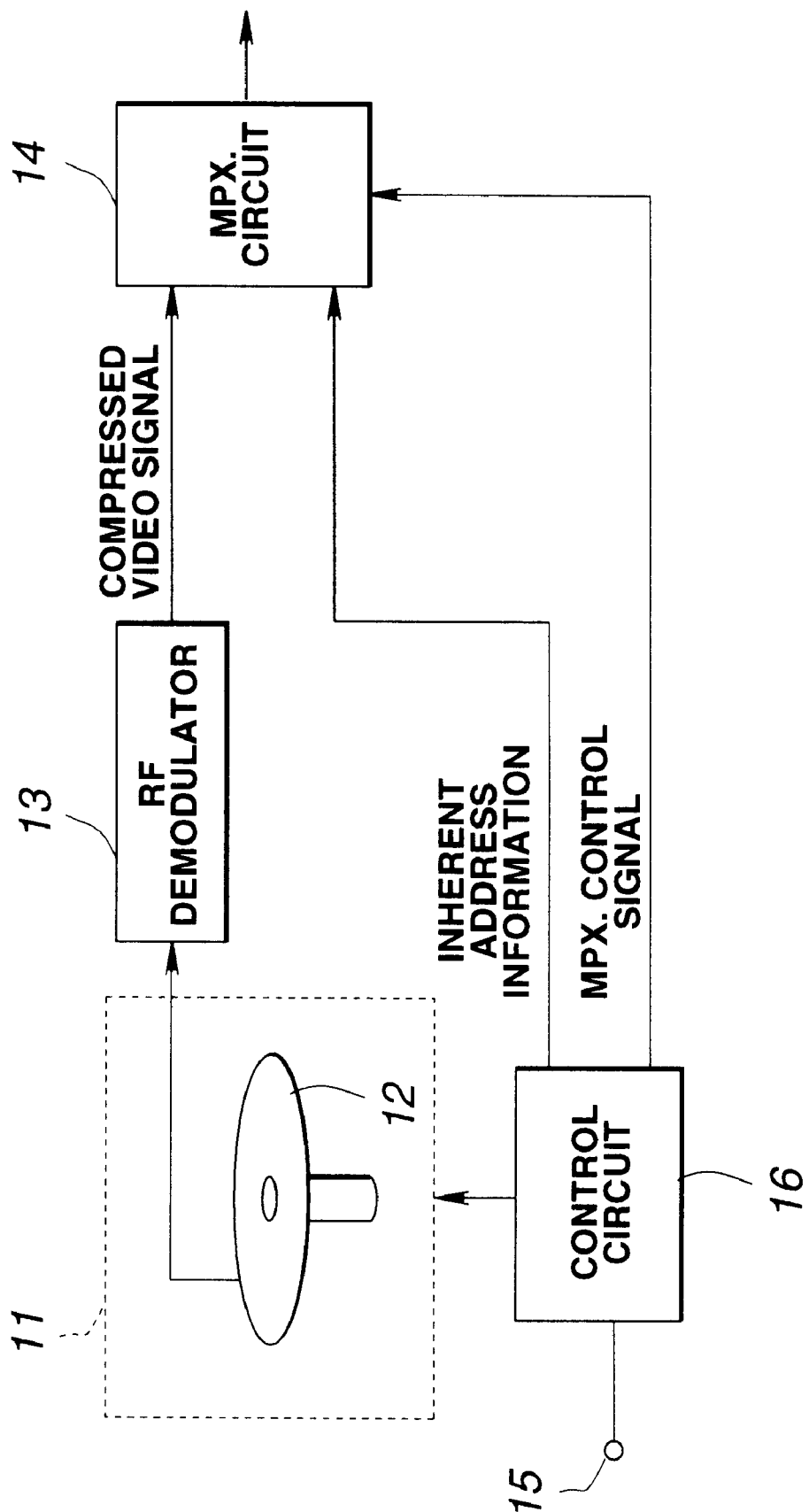
FIG. 4 is a block diagram showing outline of drive unit.

More practical configuration of the drive units 1, 2 is shown in FIG. 4.

Reproduction instruction from the control unit 3 is inputted to a control circuit 16 comprised of Central Processing Unit so called CPU, etc. through a signal input terminal 15. This control circuit 16 controls the reproduction operation of compressed video signals from a MO disc 12 within an optical system block 11 by the reproduction instruction inputted thereto. Thus, compressed video signals are reproduced every groups of pictures from the MO disc 12.

Figure 5:
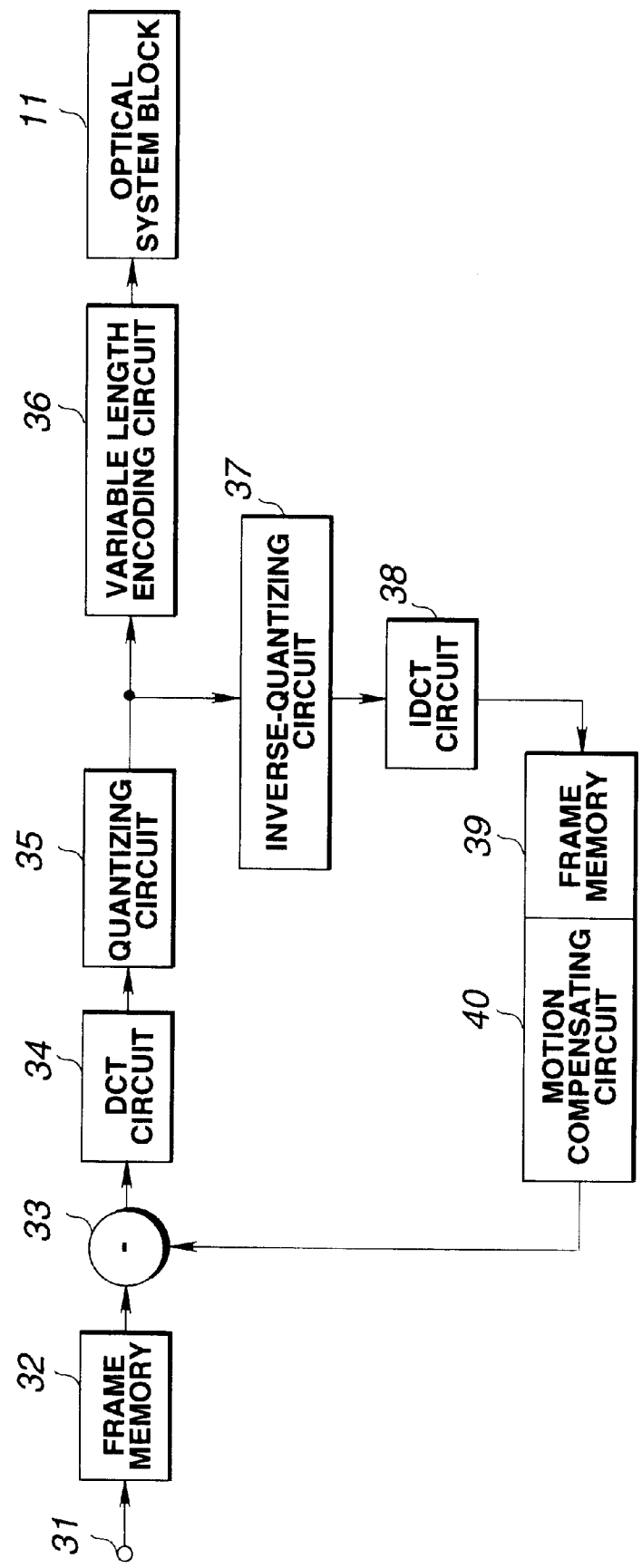
FIG. 5 is a block diagram showing outline of a video signal encoding apparatus.

Outline of the configuration of a video signal encoding apparatus for preparing compressed video signals recorded on the MO disc 12 is shown in FIG. 5.

For example, in the case where a video signal of the original picture consisting of frame picture in which the I picture encoding is designated and frame picture in which the B picture encoding is designated is inputted every frame, the video signal of the frame picture in which the I picture encoding is designated is sent to a DCT circuit 34 after by-passing a frame memory 32, at which DCT processing is implemented thereto. The video signal thus processed is sent to a quantizing circuit 35, at which DCT coefficients are quantized. Then, the picture data thus obtained is caused to undergo variable length encoding at a variable length encoding circuit 36. The picture data which has been caused to undergo variable length encoding is recorded onto the MO disc within the optical system block 11.

It is to be noted that since the predictive encoding of the previous frame in one direction is carried out with respect to the frame picture in which the P picture encoding is designated, its explanation is omitted.

At this time, the picture data in which the DCT coefficients have been quantized at the quantizing circuit 35 is sent also to an inverse-quantizing circuit 37, at which inverse-quantization is implemented thereto. The inverse-quantized picture data thus obtained is sent to an IDCT circuit 38, at which inverse-DCT processing is implemented thereto. The picture data thus processed is then written into a frame memory 39. Such a processing is called "local decode". At the time point when the video signal of two frame pictures in which the I picture encoding is designated is locally decoded, the video signal of frame picture in which the B picture encoding is designated is inputted to a subtracter 33 after undergone delay by 2 frames at the frame memory 32.

Moreover, at a motion compensating circuit 40, in order that motion compensation predictions in the forward direction and in the backward direction by two I pictures, respective motion compensating operations of locally decoded two I pictures stored in the frame memory 39 are carried out. The picture data thus obtained is outputted to the subtracter 33 as motion-compensated output after undergone averaging thereof. At the subtracter 33, a difference between the output from the motion compensating circuit 40 and the video signal of B picture is taken to carry out motion compensation predictive encoding. At times subsequent thereto, B picture is also caused to undergo DCT processing at the DCT circuit 34 similarly to the I picture. The picture data thus obtained is sent to the quantizing circuit 35, at which DCT coefficients are quantized. The picture data thus processed is then caused to undergo variable length encoding at the variable length encoding circuit 36. The encoded picture data thus obtained is recorded onto the MO disc within the optical system block 11. Thus, compressed video signals of picture data every frames are recorded every groups of pictures onto the MO disc.

The compressed video signal every group of pictures reproduced from the MO disc 12 of FIG. 4 is caused to undergo RF demodulation at a RF demodulator 13. The demodulated signal thus obtained is then sent to a multiplexing (MPX.) circuit 14.

Moreover, the control circuit 16 sends inherent address information and multiplexing control signal to the multiplexing circuit 14 after reproduction of the compressed video signal at the optical system block 11.

At this multiplexing circuit 14, inherent address information are multiplexed (superimposed) with respect to the sent compressed video signal every group of pictures. The compressed video signal on which the inherent address information are multiplexed is outputted to the transmission path.

As shown in FIG. 3, a signal outputted from the drive unit 1 is sent to the switch circuit 4 through a transmission path A, and a signal outputted from the drive unit 2 is sent to the switch circuit 4 through a transmission path B.

This switch circuit 4 carries out, at the editing point, switching between the signals sent from the respective drive units 1, 2 under control from the control unit 3 to output it to a transmission path C.

Figure 6:
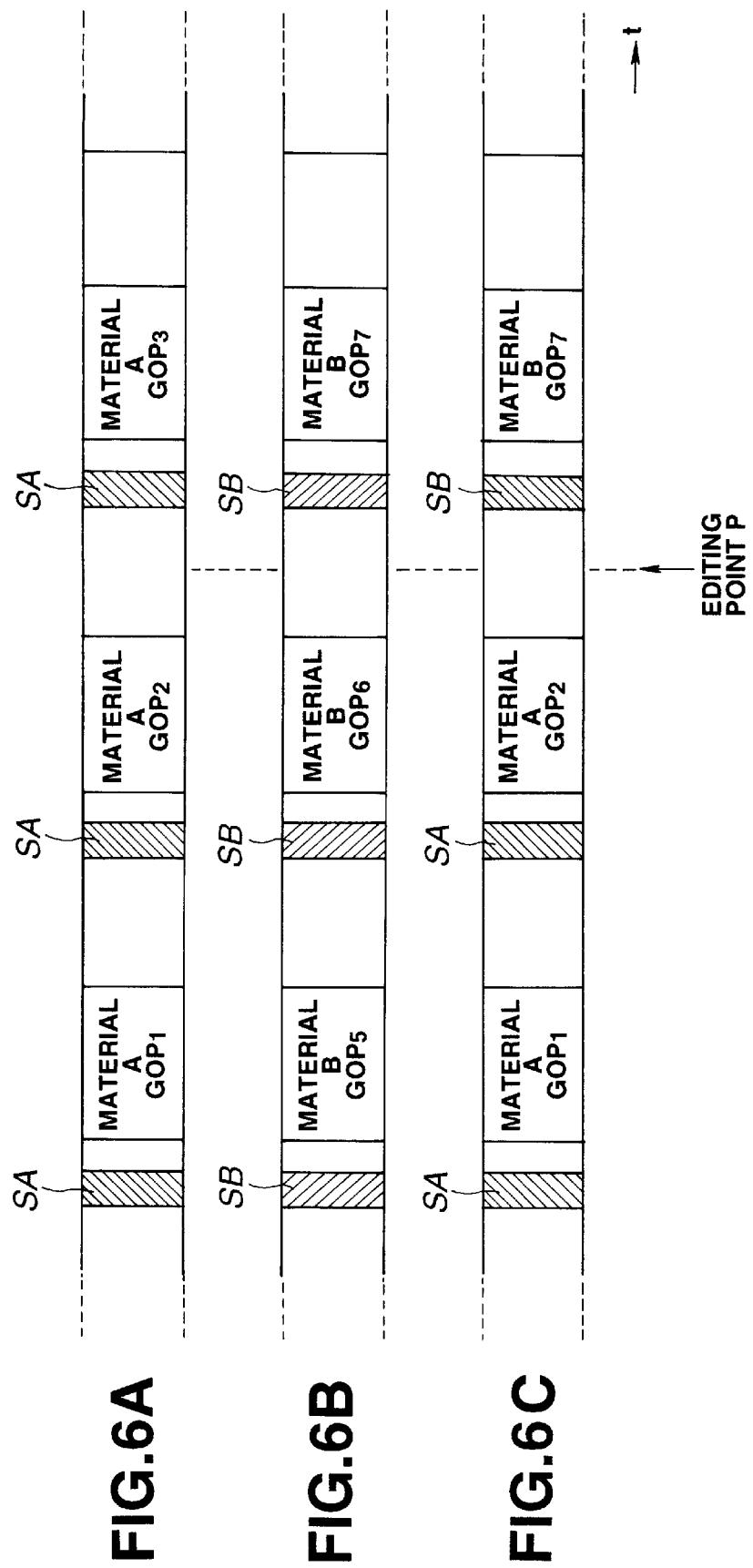
FIG. 6 is a view for explaining editing of compressed video signal.

In more practical sense, it is now assumed that, for example, in the drive unit 1, as shown in FIG. 6A, a signal in which inherent address information SA are multiplexed with respect to a compressed video signal of groups of pictures $GOP_1, GOP_2, GOP_3 \ldots$ of material A is transmitted, and that, in the drive unit 2, as shown in FIG. 6B, a signal in which inherent address information SB are multiplexed with respect to the compressed video signal of groups of pictures $GOP_5, GOP_6, GOP_7, \ldots$ of material B is transmitted. In this case, switching control is carried out at the editing point P in the switch circuit 4. Thus, as shown in FIG. 6C, for example, in the transmission path C, subsequently to the compressed video signal of groups of pictures $GOP_1$, $GOP_2$ in which inherent address information SA of the material A are multiplexed, the compressed video signal of group of pictures $GOP_7$ of material B is transmitted after undergone switching.

It is to be noted that the transmission paths A and B are based on SDDI (Serial Digital Data Interface) that the applicant of this invention has already developed, and the transmission path C is based on, e.g., the optical Fiber Distribution Data Interface (FDDI) standardized by the American National Standards Institute (ANSI).

The SDDI format will now be described with reference to FIG. 7. This SDDI format is the format which permits not only transmission of the original picture signal, but also transmission of compression-encoded picture information or speech information, or control information, etc.

Figure 7:
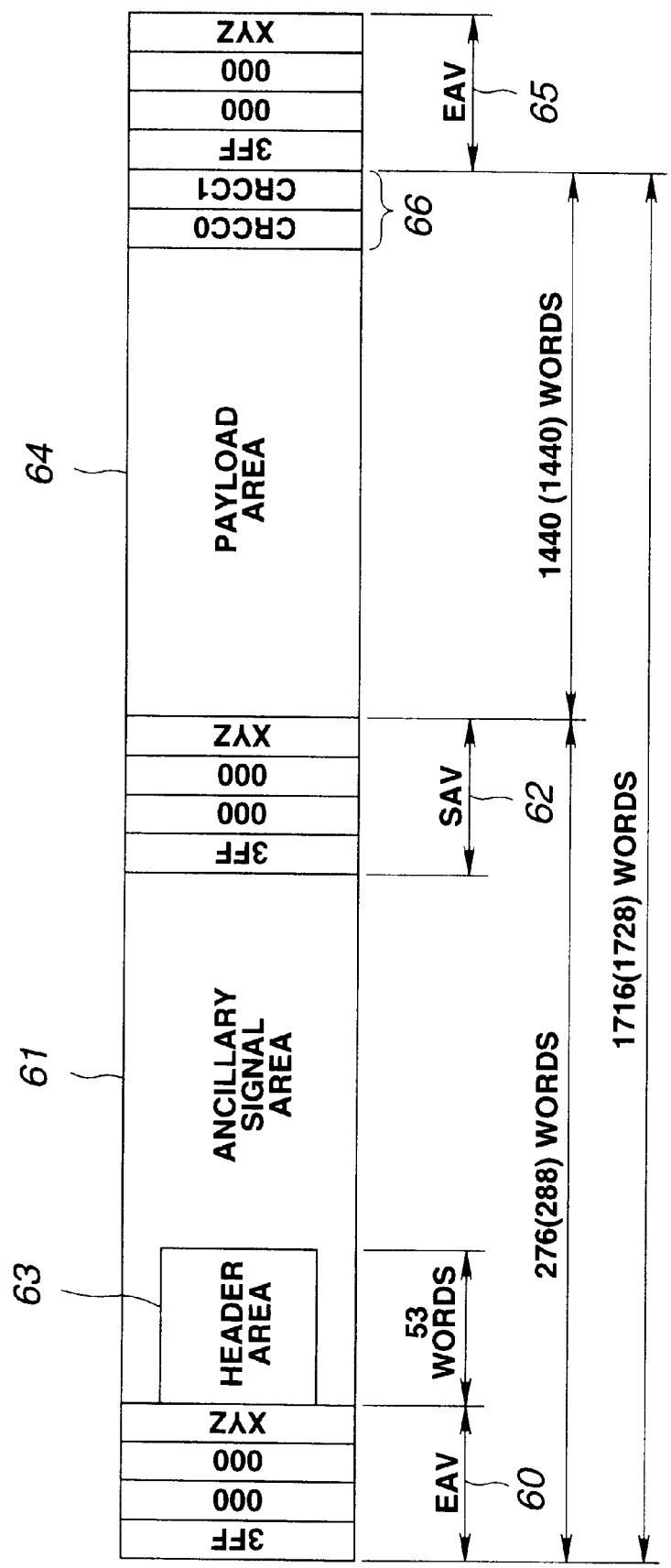
FIG. 7 is a view showing the so-called SDDI format.

In FIG. 7, EAV (End of Active Video) area 60 is provided at the leading portion. Succeedingly to the EAV area 60, ancillary signal area 61 is provided. Succeedingly to the ancillary signal area 61, SAV (Start of Active Video) area 62 is provided. The SAV and the EAV are respectively constituted by respective words of (3FF, 000, 000, XYZ)h of hexadecimal signal. The EAV area 60, the ancillary signal area 61 and the SAV area 62 consist of 276 words in the case of the system of 525 (the scanning number of lines)/60 (fields), and consists of 288 words in the case of the system of 625 (the scanning number of lines)/50 (fields).

Succeedingly to the SAV area 62, payload area 64 is provided. Compressed picture signals are disposed (allocated) within the payload area 64. The picture signal is digital data obtained by allowing the video signal to undergo efficient compression encoding processing. At the rear end portion of the payload area 64, CRCC (Cyclic Redundancy Check Code) 0, CRCC1 area 66 is provided.

The CRCC0, CRCC1 are as follows. Namely, picture data is transmitted in the state where remainder term obtained as the result of the fact that a certain division is carried out with respect to information frame transmitted through the communication line is added. At the receiving end, remainder term obtained by performing similar operation with respect to the received signal is compared to the sent remainder term to thereby check transmission error. For this divisional operation, generating function is used.

The payload area 64 including the CRCC0, CRCC1 area 66 both consists of 1440 words in both the system of the 525 (the number of scanning lines)/60 (fields) and the system of 625 (the number of scanning lines)/50 (fields).

Accordingly, the area in which the payload area 64 including the CRCC0, CRCC1 area 66 is added to the EAV area 60, the ancillary signal area 61 and the SAV area 62 consists of 1716 words in the system of 525 (the number of scanning lines)/60 (fields), and consists of 1728 words in the system of 625 (the number of scanning lines)/50 (fields).

Here, particularly, in this example, header area 63 is provided at the leading portion of the ancillary signal area 61. The header area 63 includes transmission source discrimination code, and consists of 53 words.

Succeedingly to the payload area 64, timing reference signal EAV area 65 is added. The EAV area 65 consists of respective words of (3FF, 000, 000, XYZ) h of the hexadecimal signal. The EAV area 60, the SAV area 62 and the EAV area 65 are inserted into (allocated to) the blanking period in the horizontal direction.

Figure 8:
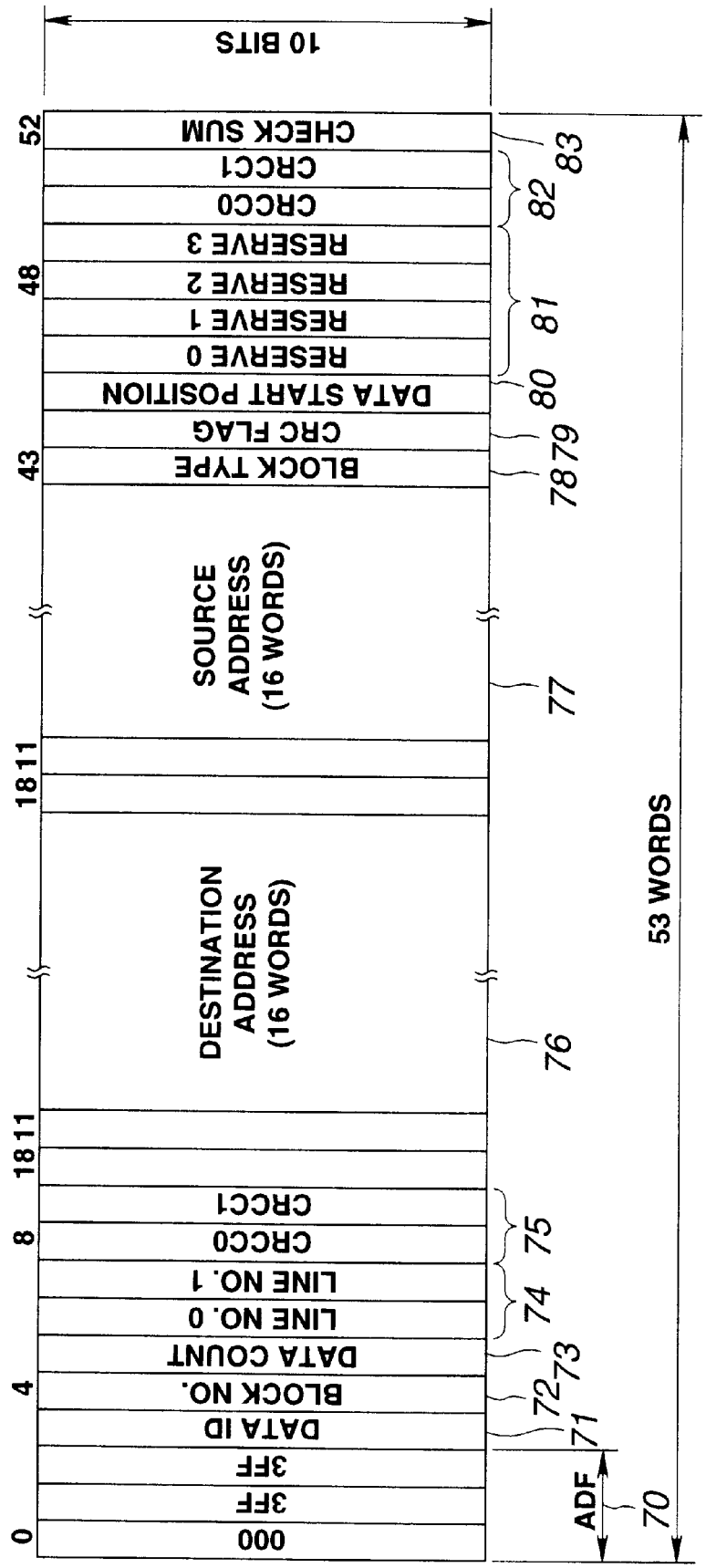
FIG. 8 is a view showing the detail of header area of the format of FIG. 7.

FIG. 8 is a view showing the detail of the header area 63 of the SDDI format of the FIG. 7 mentioned above. ADF (Ancillary Data Flag) area 70 of the leading portion of FIG. 8 consists of 3 words of (000, 3FF, 3FF) h of the hexadecimal signal. The ADF area 70 is code indicating start of packet of ancillary signal. Data ID 71 indicates the content of the ancillary signal. This is, e.g., digital audio data, time code, or error detection code, etc.

Block number 72 serves to detect continuity of data packet. In this example, count-up operation of 8 bits is carried out, thus making it possible to detect continuity up to 0–255. Data count 73 serves to count the number of words of user data within the ancillary signal.

Line No. 0, line No. 1 area 74 indicates any one of scanning line Nos. of 1~525.

CRCC0, CRCC1 area 75 is error detection code for detecting error from the ADF area 70 up to the data ID 71, the block No. 72, the data count 73 and line No. 0, line No. 1 area 74.

Destination address 76 indicates address of transmission destination of data. Source address 77 is transmission source discrimination code indicating address of transmission source of data. The source address 77 serves to add individual code unique to equipment written at the time of shipping. The source address 77 consists of data area of 16 words in this example, and consists of the number of data of 128 bits. The transmission source discrimination code is inherent address information as indicated by SA and SB of FIGS. 6A, 6B, 6C.

In addition, within the header area shown in FIG. 8, succeedingly to the source address 77, there are block type 78, CRC flag 79, data start position 80, reserve area 81 of reserve 0~3, CRCC0, CRCC1 area 82, and check sum 83. The entirety of the header area consists of 53 words.

A compressed video signal transmitted in the state where inherent address information are multiplexed is inputted to the decoding unit 5 of FIG. 3. In this decoding unit 5, inherent address information every group of pictures of the inputted compressed video signal are extracted to detect change of the inherent address information to thereby detect the editing point. In the case where no editing point is detected, ordinary decoding processing is carried out with respect to the compressed video signal of group of picture unit to output video signal. On the contrary, in the case where the editing point is detected, such a decoding processing to be completed within the group of pictures is carried out with respect to the compressed video signal of the group of picture unit before and after the editing point. This decoded video signal is outputted from a signal output terminal 6.

Figure 9:
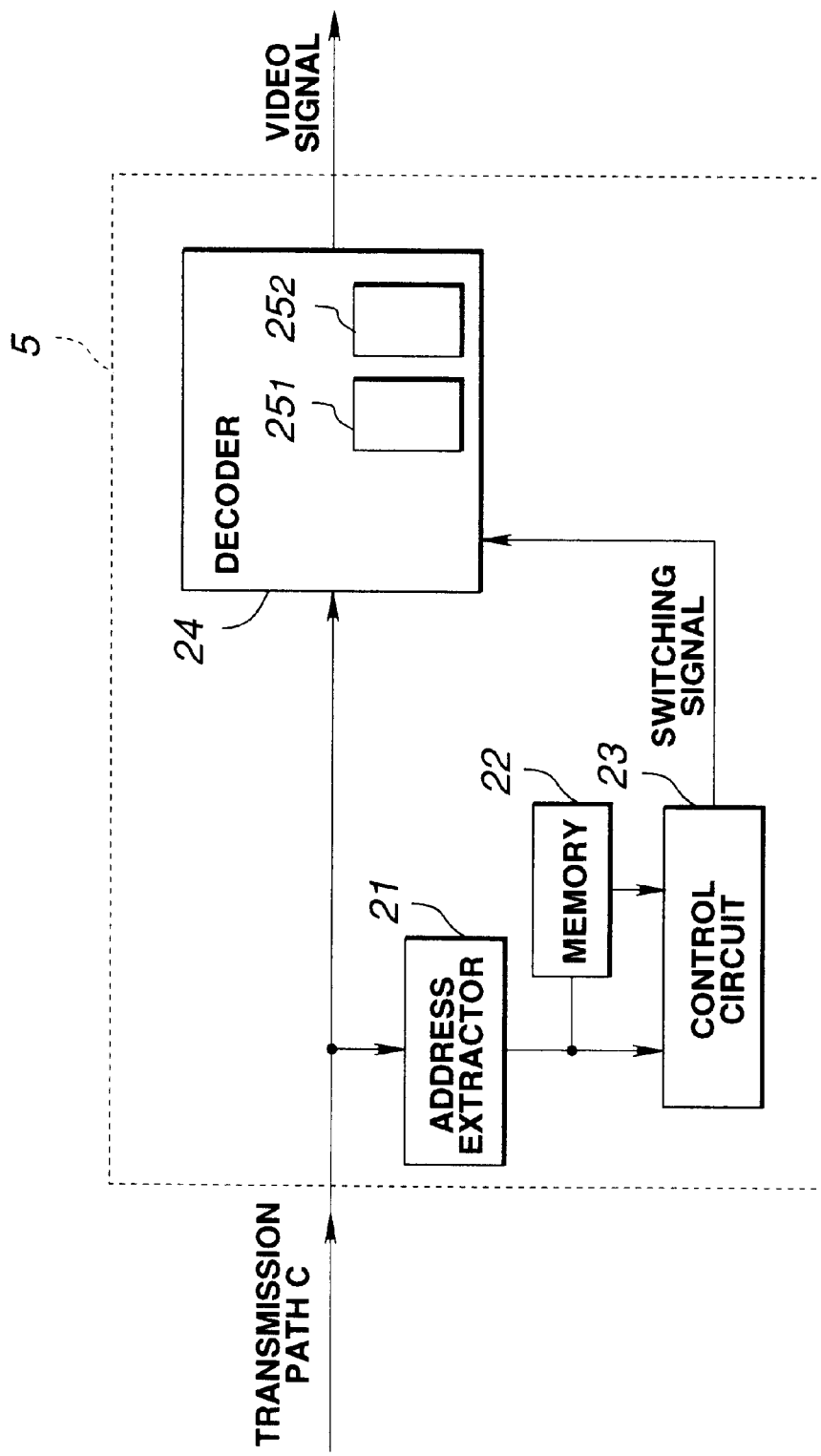
FIG. 9 is a block diagram showing outline of a decoding apparatus.

More practical configuration of the decoding apparatus 5 is shown in FIG. 9.

This decoding apparatus comprises an address extractor 21 serving as extracting means for extracting inherent address information every group of pictures of a compressed video signal, a memory 22 for storing inherent address information every group of pictures extracted by the address extractor 21, a control circuit 23 serving as detecting means for detecting, as the editing point of the compressed video signal, the point where different inherent address information exist before and after the group of pictures, and a decoder 24 for decoding the compressed video signal.

In this decoding apparatus, a compressed video signal in which inherent address information are multiplexed, which is transmitted from the transmission path C, is sent to the decoder 24, and is also sent to the address extractor 21.

In this address extractor 21, inherent address information multiplexed (superimposed) with respect to the transmitted compressed video signal are sequentially extracted. These extracted inherent address information are stored into the memory 22, and are sent to the control circuit 23 comprised of Central Processing Unit so called CPU, etc.

In the control circuit 23, inherent address information multiplexed with respect to the compressed video signal of group of pictures earlier by one stored in the memory 22 and inherent address information multiplexed with respect to the compressed video signal of the subsequent group of pictures sent from the address extracter 21 are compared with each other at all times. When such an approach is employed, in the case where inherent address information different from the inherent address information multiplexed on the compressed video signal of group of pictures earlier by one is detected, a switching signal is outputted to the decoder 24.

This decoder 24 carries out general decoding processing with respect to a compressed video signal inputted thereto. Moreover, two frame memories $25_1, 25_2$ are provided within the decoder 24. I pictures or P pictures of the inputted group of pictures are stored into these frame memories. In the case where the switching signal is inputted to the decoder 24, pictures stored in the frame memory $25_1$, or the frame memory $25_2$ are used, i.e., only pictures within the group of pictures are used to carry out decoding processing of the compressed video signal of the group of pictures.

The decoding processing within the group of pictures will now be described. In this decoding processing, such a decoding processing to be completed within the editing unit (GOP) is carried out with respect to the compressed video signal of the group of pictures (GOP) serving as the editing unit before and after the editing point. As such decoding processing, there are enumerated a processing to decode predetermined compressed video information, e.g., B picture of the leading position of GOP, which is to be to decoded by using picture information within the other editing unit, in the state replaced into intra coded picture information, e.g., I picture in the vicinity of the predetermined compressed picture information (B picture) within the predetermined editing unit, or to decode the B picture merely by the prediction in one direction by using only I picture within the same GOP.

A first embodiment of the decoding processing will be first described with reference to FIG. 10.

Figure 10:
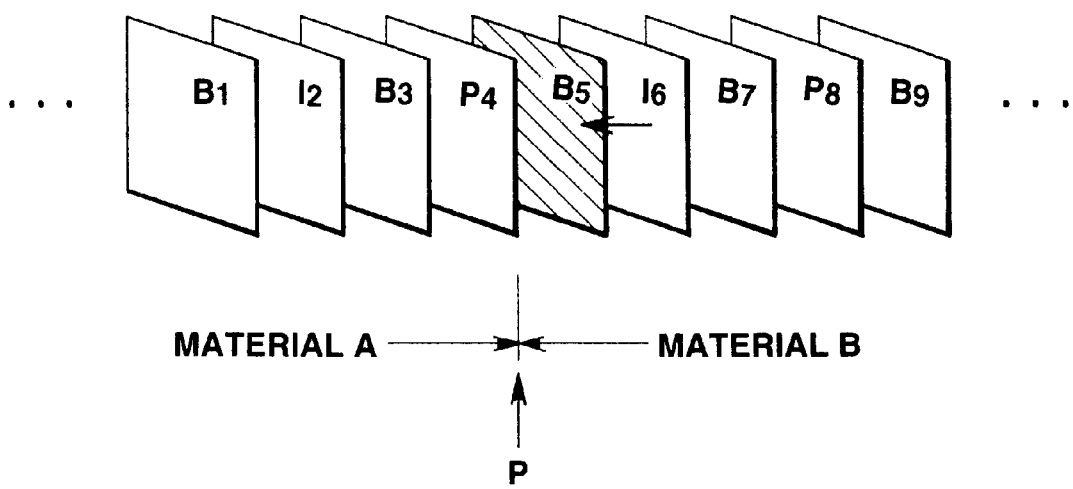
FIG. 10 is a view for explaining a first embodiment of decoding processing.

In FIG. 10, pictures up to the $P_4$ picture are a compressed video signal from the material A. In the case where the editing point P is detected after the $P_4$ picture, there is used a processing to replace $I_6$ picture stored in the frame memory $25_1$, or the frame memory $25_2$ within the decoder 24 of FIG. 9 with respect to B picture for carrying out bidirectional predictive encoding, which is the first picture of the group of pictures after the editing point P.

Figure 11A:
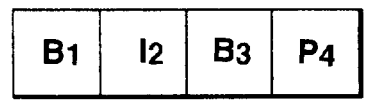
FIG. 11 is a view showing transmission format of transmission path.
Figure 11B:
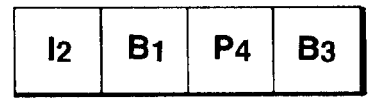

Here, with respect to the order of pictures within the group of pictures transmitted through the transmission path C, in the case where these pictures are in order of $B_1, I_2, B_3, P_4$, as shown in FIG. 11A, for example, they are transmitted in order of $I_2, B_1, P_4, B_3$.

Figure 12:
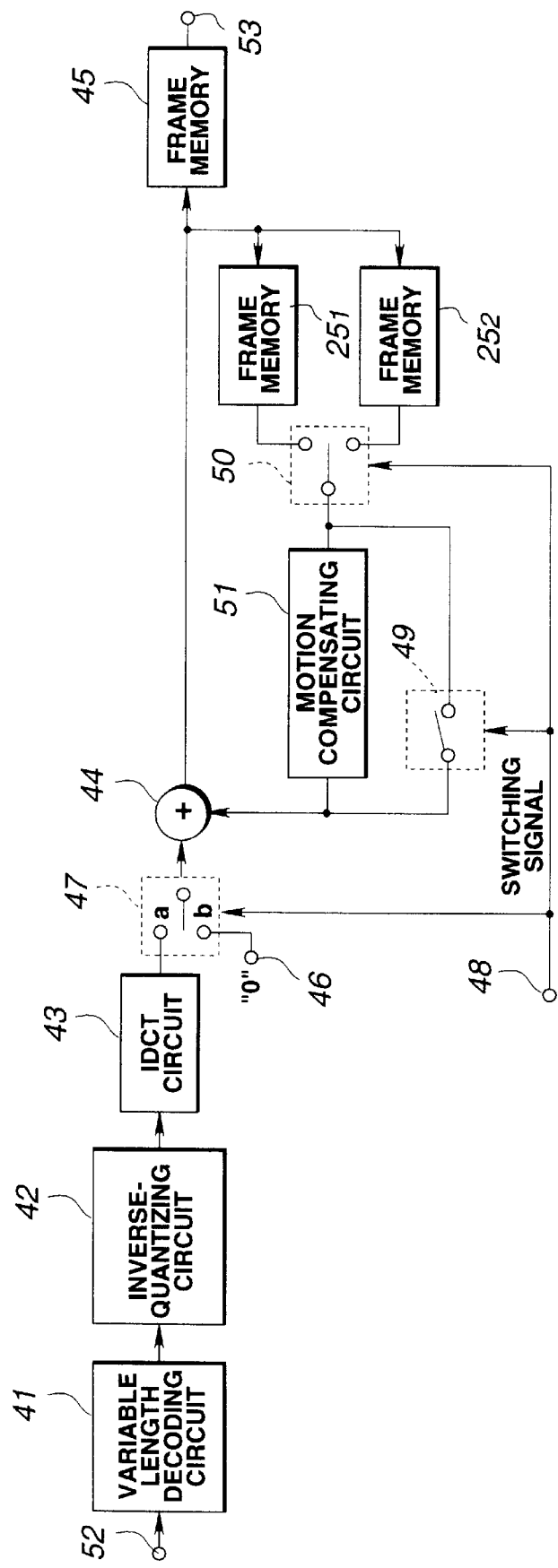
FIG. 12 is a block diagram in a more practical sense of decoder.

Moreover, more practical configuration of the decoder 24 for decoding respective pictures every group of pictures to be transmitted is shown in FIG. 12.

Initially, transmitted picture data is inputted from a signal input terminal 52, and is caused to undergo variable length decoding at a variable length decoding circuit 41. The picture data thus decoded is inverse-quantized at an inverse-quantizing circuit 42. The picture data thus processed is then caused to undergo inverse-DCT processing at an IDCT circuit 43. The picture data thus processed is outputted as a video signal.

In this instance, a signal input terminal 48 is supplied with the switching signal outputted from the control circuit 23 of FIG. 9. By this switching signal, signal switchers 47, 49, 50 are respectively switched. In the case where the ordinary decoding processing is carried out, the above-mentioned switching signal is not inputted. In the case where replacement (substitution) processing is carried out, the above-mentioned switching signal is inputted.

Thus, in the signal switcher 47, in the case where the switching signal is not inputted, this signal switcher 47 is switched to the terminal a side. In contrast, in the case where the switching signal is inputted, the signal switcher 47 is switched to the terminal b side.

In the case where the switching signal is not inputted, the video signal from the IDCT circuit 43 is written into a frame memory 45 through the signal switcher 47 switched to the terminal a side and an adder 44. Moreover, this video signal is also written into the frame memory $25_1$, or the frame memory $25_2$. The frame memory $25_1$ and the frame memory $25_2$ are respectively connected to the terminal a and the terminal b of the signal switcher 50. The video signal stored in the frame memory $25_1$ or the frame memory $25_2$ is outputted through the signal switcher 50 switched by the switching signal.

Moreover, in the case where the ordinary decoding processing is carried out, the signal switcher 49 is not connected. As a result, a video signal from any one of the frame memory $25_1$ and the frame memory $25_2$ is outputted to a motion compensating circuit 51. At this motion compensating circuit 51, motion compensation prediction of the video signal sent thereto is carried out. The motion-compensated video signal thus obtained is sent to the adder 44. At this adder 44, video signal of B picture from the IDCT circuit 43 and output from the motion compensating circuit 51 are added. The added signal thus obtained is outputted from a signal output terminal 53 after by-passing the frame memory 45.

On the other hand, in the case where replacement processing to replace I picture with respect to B picture after the editing point P is carried out as shown in FIG. 10, the signal switcher 49 is connected by the switching signal. As a result, the video signal of I picture stored in the frame memory $25_1$ or the frame memory $25_2$ is outputted from the signal switcher 50 switched by the switching signal, and is sent to the adder 44 through the signal switcher 49. Moreover, the signal switcher 47 is switched to the terminal b side by the switching signal. The terminal b of the signal switcher 47 is connected to a signal input terminal 46. Therefore, zero data ('0' data) from the signal input terminal 46 is sent to the adder 44 through the signal switcher 47. Thus, the zero data is added to the video signal of I picture at the adder 44. The picture data thus obtained is outputted therefrom. Namely, output data from the adder 44 is the video signal of I picture. This video signal is outputted from the signal output terminal 53 through the frame memory 45.

As described above, since I picture has been already transmitted before B picture, and the I picture thus transmitted is stored in the frame memory $25_1$ or the frame memory $25_2$, it is possible to replace I picture stored in the frame memory $25_1$ or the frame memory $25_2$ with respect to B picture after the editing point P.

Figure 13:
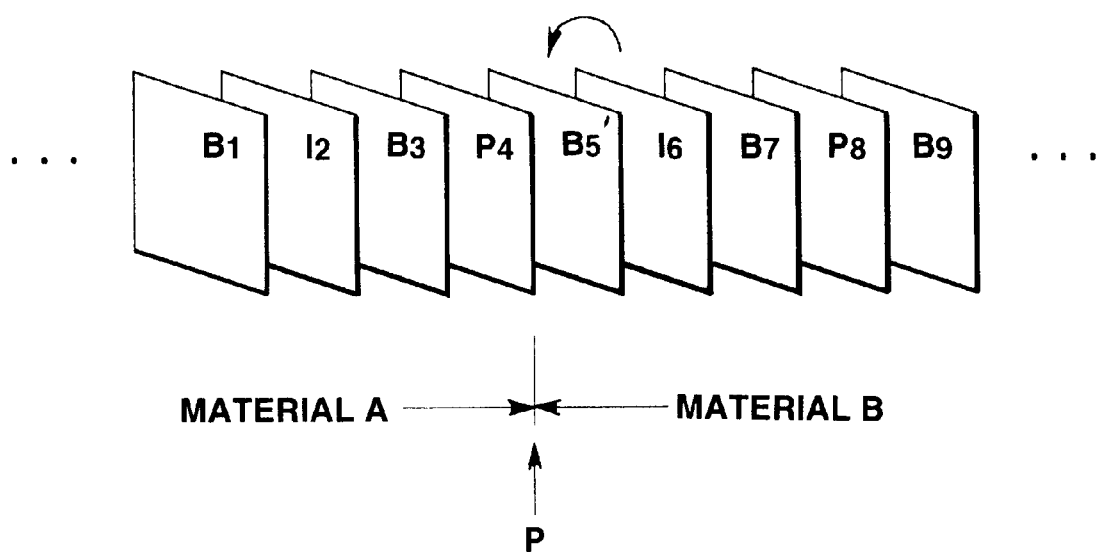
FIG. 13 is a view for explaining a second embodiment of decoding processing.

Further, as a second embodiment of the decoding processing, it is also possible to prepare $B_5'$ picture by the prediction in one direction only from $I_6$ picture which has correlation without use of the bidirectional prediction as shown in FIG. 13.

As stated above, when the editing point is detected, such an approach is employed to carry out decoding processing to be completed within the group of pictures in carrying out the decoding processing of the compressed video signal of the group of pictures before and after the editing point, thereby making it possible to carry out decoding processing without deteriorating the picture quality.

As is clear from the foregoing description, the compressed video signal editing apparatus according to this invention comprises the sending unit for outputting compressed video signals of plural frames in the state where discrimination information for discriminating between signal sources are added every editing units each consisting of the compressed video signal of plural frames to output the compressed video signals every the editing units from the video signal outputs after undergone switching, and the detecting unit for extracting the discrimination information every the editing units of the compressed video signals from the sending unit to compare the extracted discrimination information every the editing units to detect, as the editing point of the compressed video signal, the point where different discrimination information exist before and after the editing unit, whereby in the case where when compressed video signals using the interframe predictive encoding as in the MPEG system have been edited after undergone switching, the compressed video signal obtained as the result of the fact that they have been edited after undergo switching is decoded, it is possible to obtain video signal of satisfactory picture quality in the state where no noise is outputted at the editing point.

Moreover, the compressed video signal editing method according to this invention comprising the steps of: outputting compressed video signals of plural frames in the state where discrimination information for discriminating between signal sources are added every editing units each consisting of the compressed video signal of plural frames; outputting the compressed video signals every the editing units from plural ones of the stages for outputting compressed video signals after undergone switching; extracting the discrimination information every the editing units of the compressed video signals; and comparing the extracted discrimination information every the editing units to detect, as the editing point, the point where different discrimination information exist before and after the editing unit, whereby in the case where when compressed video signals using the interframe predictive encoding as in the case of the MPEG system have been edited after switching, the compressed video signal obtained as the result of the fact that they have been edited after switching is decoded, it is possible to obtain video signal of satisfactory picture quality without outputting noise at the editing point.

Further, the compressed video signal decoding apparatus according to this invention comprises detecting means for extracting discrimination information for discriminating between signal sources, which are added every editing units each consisting of compressed video signal of plural frames to detect, as the editing point, the point where different discrimination information exist before and after the editing unit, whereby when the editing point is detected by the detecting means, such a decoding processing to be completed within the editing unit is carried out with respect to the compressed video signals of the editing unit before and after the editing point. Thus, even in the case where the compressed video signal decoding apparatus is away from the sending unit for sending the edited compressed video signal, it is possible to send out it by a single signal line. Thus, video signal of satisfactory picture quality can be obtained.

I claim:

1. A compressed video signal editing apparatus comprising:

a sending unit including a plurality of signal sources each outputting a compressed video signal representative of a number of groups of pictures (GOPs), means for generating respective discrimination information for each of said signal sources and for respectively combining the appropriate discrimination information to each of said GOPs of the compressed video signal outputted from each respective signal source such that the signal source which outputted each of said GOPs of the compressed video signal is identifiable by the discrimination information, and switching means for switching between the outputted compressed video signal of one signal source to the outputted compressed video signal of another signal source at an editing point wherein the discrimination information before the editing point is different from the discrimination information after the editing point; and a decoding unit having extracting means for extracting the discrimination information of the GOPs of the compressed video signals from the sending unit, and detecting means for detecting the editing point of the compressed video signals in accordance with the extracted discrimination information.

2. A compressed video signal editing apparatus as set forth in claim 1, wherein the decoding unit further includes decoder means for performing decoding processing involving the GOP occurring after the detection of the editing point.

3. A compressed video signal editing method comprising the steps of:

outputting a compressed video signal representative of a number of groups of pictures (GOPs) from each of a plurality of signal sources;

generating respective discrimination information for each of said signal sources and respectively combining the appropriate discrimination information to each of said GOPs of the compressed video signal outputted from each respective signal source such that the signal source which outputted each of said GOPs of the compressed video signal is identifiable by the discrimination information;

switching between the outputted compressed video signal of one signal source to the outputted compressed video signal of another signal source at an editing point wherein the discrimination information before the editing point is different from the discrimination information after the editing point;

extracting the discrimination information of the GOPs of the compressed video signals; and comparing the extracted discrimination information of the GOPs to detect the editing point of the compressed video signals.

4. A compressed video signal editing method as set forth in claim 3, further comprising the step of performing decoding processing involving the GOP occurring after the detection of the editing point.

5. A compressed video signal editing method as set forth in claim 3, wherein the discrimination information is transmission source discrimination code indicating data transmission source address located within a header area of a transmission format of the compressed video signal.

6. A compressed video signal decoding apparatus for receiving compressed video signals representative of a number of groups of pictures (GOPs) from a plurality of signal sources in which discrimination information had been combined to each of said GOPs of the compressed video signal outputted from each respective signal source such that the signal source which outputted each of said GOPs of the compressed video signal is identifiable by the discrimination information, said apparatus comprising:

means for extracting the discrimination information of the GOPs of the compressed video signal to detect an editing point whereat the discrimination information before and after the editing point are different, and decoding means, responsive to the detection of the editing point, for performing decoding processing within the GOP with respect to the compressed video signal of the GOPs before and after the editing point.

7. A compressed video signal decoding apparatus as set forth in claim 6, wherein the decoding processing within a respective one of the GOPs includes using picture information within another GOP such that intra coded picture information is replaced in the vicinity of the respective GOP.

8. A compressed video signal decoding apparatus as set forth in claim 6, wherein the decoding processing within a respective one of the GOPs includes using picture information within another GOP so as to carry out only prediction using intra coded picture information in the vicinity of the respective GOP.

9. A decoding apparatus for decoding compressed video signals transmitted on the basis of a predetermined transmission format, the apparatus comprising:

extracting means for extracting, for each editing unit of the video signals, inherent address information indicating transmission source of the video signals superimposed along with the video signals;

detecting means for detecting a change of the inherent address information extracted by the extracting means; and decoding means, responsive to the detected change of the inherent address information by the detecting means, for decoding pictures of the video signal by using only the pictures within the editing unit.

10. A decoding apparatus as set forth in claim 9, wherein the predetermined transmission format includes ancillary signal area for recording ancillary data relating to the video signal, and payload area for recording the compressed video signal, and wherein the extracting means extracts the inherent address information from a header area of the ancillary signal area.

11. A decoding apparatus as set forth in claim 10, wherein source address data indicating transmission source of material and destination address data indicating transmission destination of material are recorded in the header area of the predetermined transmission format, and wherein the extracting means extracts the inherent address information from the source address data stored in the header area.

* * * * *